Oct. 22, 1957 T. O. MATHUES 2,810,301
STEERING WHEEL AND METHOD OF MAKING SAME
Filed June 18, 1952
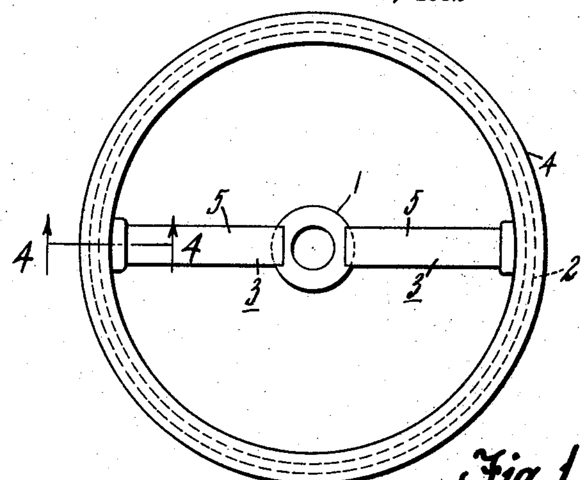
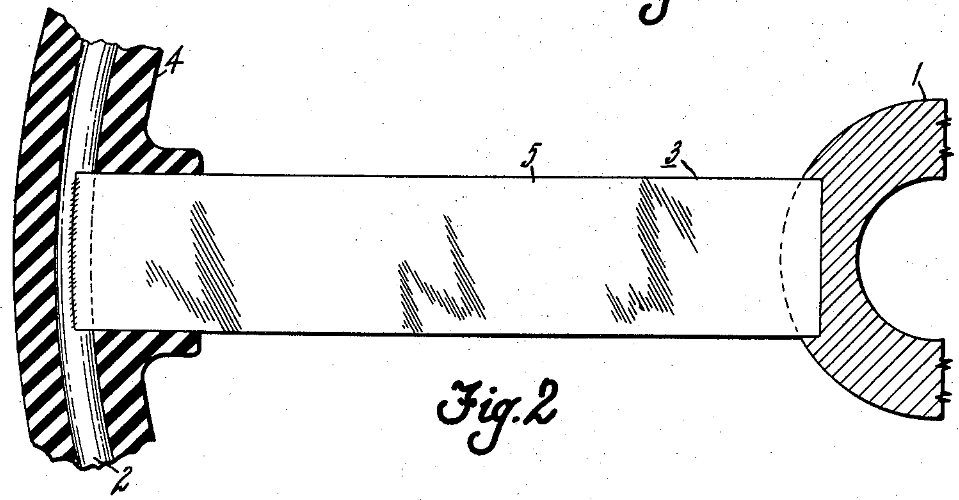
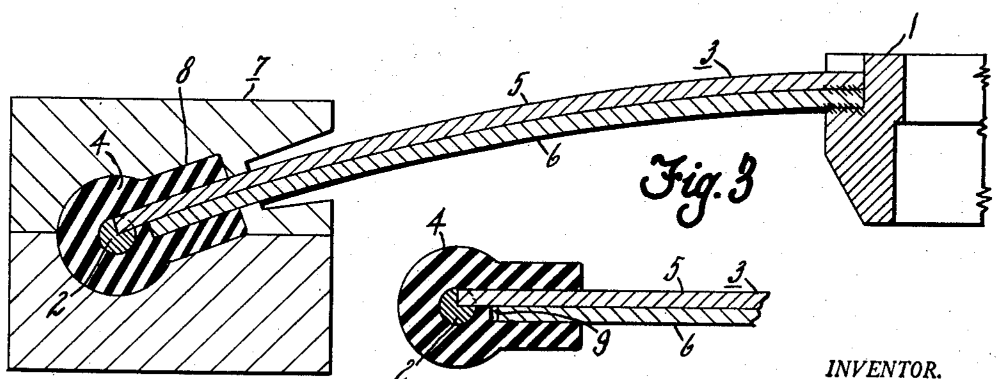
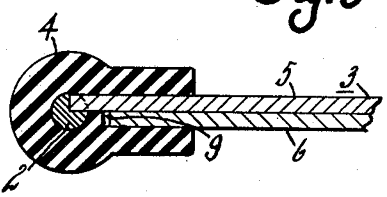
Fig. 4
INVENTOR.
THOMAS O. MATHUES
BY
Willits, Hardman and Fehr
HIS ATTORNEYS United States Patent Office 2,810,301 Patented Oct. 22, 1957

2,810,301

STEERING WHEEL AND METHOD OF MAKING SAME

Thomas O. Mathues, Dayton, Ohio, assignor to General Motors Corporation, Detroit, Mich., a corporation of Delaware Application June 18, 1952, Serial No. 294,224

6 Claims. (Cl. 74—552)

The present invention relates to steering wheels generally, and more particularly to a steering wheel in which the rim vibrations are minimized.

Fatigue and discomfort experienced by vehicle operators are at least partially attributable to the vibration transmitted to the operator through the steering wheel rim. Accordingly, among my objects are the provision of a steering wheel having frictional damping means to reduce rim vibration, and the further provision of a method of making a steering wheel of this character.

The aforementioned and other objects are accomplished in the present invention by inducing frictional damping in a steering wheel through the utilization of multiple leaf spokes. Specifically, the steering wheel rim and the hub are interconnected by a plurality of spokes. Each spoke includes a plurality of leaf members, one of which is attached at its extremities to the hub and the rim insert and superimposed on one or more leaf members that are only attached to the hub. Frictional damping is afforded by reason of the relative movement between the leaf members during flexing thereof caused by movement of the wheel rim in a plane normal to the plane of the spokes.

The preferred method of making a steering wheel of this character includes the steps of flexing the spokes by movement of the rim insert downwardly out of the plane of the hub. This movement tends to make the arcuate length of the leaf members approach equality. The leaf spring spokes are maintained in this flexed position, while the rim insert and end portions of the spokes are positioned in a mold cavity. After the rim portion, which encompasses the hub and spoke assembly, has been formed thereon by a molding operation, the rim is moved upwardly into the plane of the hub, thereby breaking the adherent bond between the molded rim portion and all except one of the leaf members constituting each spoke.

Further objects and advantages of the present invention will be apparent from the following description, reference being had to the accompanying drawing wherein a preferred embodiment of the present invention is clearly shown.

In the drawing:

Fig. 1 is a plan view of the improved steering wheel constructed according to the present invention.

Fig. 2 is an enlarged fragmentary sectional view taken in a plane parallel to the plane of the drawing.

Fig. 3 is an enlarged fragmentary sectional view illustrating one of the steps in the manufacture of the molded rim.

Fig. 4 is an enlarged fragmentary sectional view taken along line 4—4 of Fig. 1.

Referring more particularly to the drawing, a steering wheel is shown comprising a hub 1, a reinforcing ring or rim insert 2, and a plurality of spokes 3 interconnecting the hub and the rim insert. A molded rim portion 4 encompasses the rim insert 2 and end portions of the spokes 3. The rim 4 may be composed of any suitable thermoplastic or thermo-setting resin, or rubber.

In conventional steering wheels vibrations of considerable amplitude are transmitted from the hub to the wheel rim during vehicle operation. These vibrations are of considerable annoyance to vehicle operators and tend to cause operator fatigue. The present invention is directed primarily to a steering wheel construction wherein the amplitude of the rim vibrations is controlled and reduced through frictional damping. In accordance with this principle and with particular reference to Fig. 3, each of the spokes 3, which interconnect the rim with the hub, include frictional damping means. In the form shown, the spokes comprise a pair of leaf spring members 5 and 6. The leaf members 5 and 6 are superimposed and the top leaf member 5 is rigidly attached at its ends to the hub 1 and the rim insert 2 by any suitable means, such as welding. The lower leaf 6 is shorter than the upper leaf 5 and is only attached at one of its ends to the hub 1 by means of a weld. The leaf members 5 and 6 have surfaces in intimate contact. By reason of the shorter leaf members 6 being attached at only one of its ends, relative movement can occur between the members 5 and 6. However, this relative movement is retarded by the frictional engagement between the contacting surfaces. In other words, movement of the rim 4 tends to flex the leaf spring members 5 and 6 whereupon a rubbing or scraping action results between the two leaf members, which effectively frictionally damps the transmission of vibration from the hub 1 to the rim 4. It is to be understood that any number of superimposed leaf spring members may be utilized in constructing the spokes, the leaf members being of progressively decreasing length and only one of which is attached to both the hub and the rim of the steering wheel. Moreover, the loose leaf member or members can be located above or below the fixed leaf member.

In order to transmit relative movement between the leaf members comprising the spokes, the rim 4 must be molded in such a manner that the rim does not prevent relative movement between the leaf members. In other words, there must be no adherent bond between the molded rim portion 4 and the leaf members of the spokes which are not attached to the rim insert 2. Accordingly, the steering wheel rim portion is preferably molded in the following manner. Initially the rim insert 2 is moved downwardly out of the plane of the hub 1 to the position it is shown in Fig. 3. This movement of the rim insert 2 flexes the spokes 3 and tends to make the arcuate lengths of the leaf members 5 and 6 approach equality. With the rim insert 2 and the spokes 3 held in this position relative to the hub, a two-part mold 7 having a suitable cavity 8 is positioned around the rim insert 2 and a portion of the leaf members comprising the spokes 3. Thereafter, the rim portion 4 is formed by any suitable molding operation. After the molded rim portion has cured or set sufficiently, the rim 4 is moved upwardly back into the plane of the hub 1, whereupon the adherent bond between the molded rim portion 4 and the leaf member 6 is broken. Thus, as is shown in Fig. 4, a cavity 9 is produced within the rim 4 permitting relative movement between the leaf members 5 and 6. It is thus apparent that movement of the rim 4 in a plane normal to the plane of the spokes 3 can ony be accomplished by flexing the leaf spring members 5 and 6 which constitute the spoke. During flexing of the leaf spring members, the member 6 tends to move along the surface of the member 5 with friction and pressure. Accordingly, any vibration which is transmitted to the rim will be frictionally damped due to the rubbing or scraping of the intimate contacting areas of the relative leaf members, which constitute the steering wheel spokes.

While the embodiment of the present invention as herein disclosed, constitutes a preferred form, it is to be understood that other forms might be adopted.

What is claimed is as follows:

1. A steering wheel comprising, a hub, a reinforcing ring, a plurality of spokes interconnecting said ring and said hub, and a rim portion encompassing said ring and portions of said spokes, each spoke comprising a pair of superimposed leaf members of different length and having their inner ends anchored to said hub, one of said leaf members having its outer end anchored to said ring, the other of said leaf members having its outer end disposed within a rim cavity and slidable relative thereto.

2. A steering wheel comprising a hub, a reinforcing ring concentrically disposed with respect to said hub, a plurality of spokes interconnecting said ring and said hub, and a molded rim section encompassing said ring and portions of said spokes, each spoke comprising a pair of superimposed leaf spring members of different length and having their inner ends anchored to said hub, one of said leaf spring members having its outer end anchored to said ring and adherently connected to said molded rim, the other of said leaf spring members having its outer end disposed within a rim cavity and slidable relative thereto, said leaf spring members having contiguous surfaces in frictional engagement.

3. A steering wheel comprising, a hub, a reinforcing ring, a plurality of spokes interconnecting said ring and said hub, and a rim section encompassing said ring and portions of said spokes, said spokes including a plurality of superimposed relatively movable leaf members, each of which is attached to said hub but only one of which is attached to said ring, said leaf members having contiguous surfaces in frictional engagement whereby the transmission of vibration from said hub to said rim is minimized, the other of said leaf members having an end disposed within a rim cavity and slidable relative thereto.

4. A steering wheel comprising a hub, a reinforcing ring, a plurality of spokes interconnecting said ring and said hub, and a molded rim portion encompassing said ring and portions of said spokes, said spokes including a plurality of superimposed relatively movable leaf spring members, each of which is attached to said hub but only one of which is attached to said ring, said leaf spring members having contiguous surfaces in frictional engagement, said molded rim portion adherently engaging said one leaf spring member whereby the vibrations transmitted to said rim are frictionally damped by the relative movement between said leaf spring members, the other of said leaf spring members having one end disposed within a rim cavity and slidable relative thereto.

5. The method of making a steering wheel rim having a reinforcing ring interconnected with a hub by a plurality of spokes comprising a plurality of relatively movable leaf members of different lengths, each of which is attached to said hub but only one of which is attached to said ring to provide frictional vibration damping, which comprises, flexing said spokes and ring out of the plane of said hub, then locating said ring and portions of said flexed spokes in a mold cavity and forming a molded rim portion encompassing said ring and portions of said spokes by a molding operation, and thereafter breaking the adherent bond between said rim portion and all except said one leaf member of each spoke.

6. The method of making a steering wheel rim having a reinforcing ring interconnected with a hub by a plurality of spokes comprising a plurality of relatively movable leaf members of different lengths, each of which is attached to said hub but only one of which is attached to said ring to provide frictional vibration damping, which comprises, flexing said spokes and ring out of the plane of said hub, then locating said ring and portions of said flexed spokes in a mold cavity and forming a molded rim portion encompassing said ring and portions of said spokes by a molding operation, and thereafter returning said ring and spokes to the plane of said hub whereby the adherent bond between said molded rim portion and all except said one leaf member of each spoke is broken.

References Cited in the file of this patent

UNITED STATES PATENTS

| | | |
|---|---|---|
| Re. 20,807 | Beck | July 26, 1938 |
| 1,280,724 | Harroun | Oct. 8, 1918 |
| 1,740,387 | Beck | Dec. 17, 1929 |
| 1,807,657 | Geyer | June 2, 1931 |
| 1,847,414 | Smith | Mar. 1, 1932 |
| 2,082,221 | Sheller | June 1, 1937 |
| 2,100,147 | Oehman | Nov. 23, 1937 |
| 2,275,591 | Leonard | Mar. 10, 1942 |

FOREIGN PATENTS

| | | |
|---|---|---|
| 20,792 | Great Britain of 1905 | Oct. 13, 1905 |
| 295,523 | Great Britain | Aug. 16, 1928 |
| 597,885 | France | Dec. 1, 1925 |